2 Sheets—Sheet 1.
T. J. Martin.
Cultivator.
No. 86,170. Patented Jun. 26, 1869.
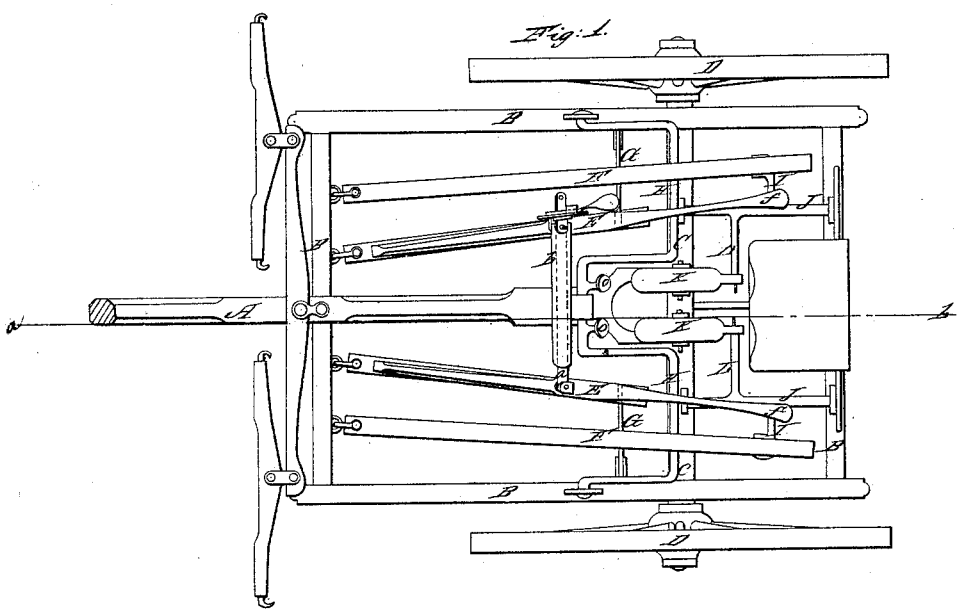
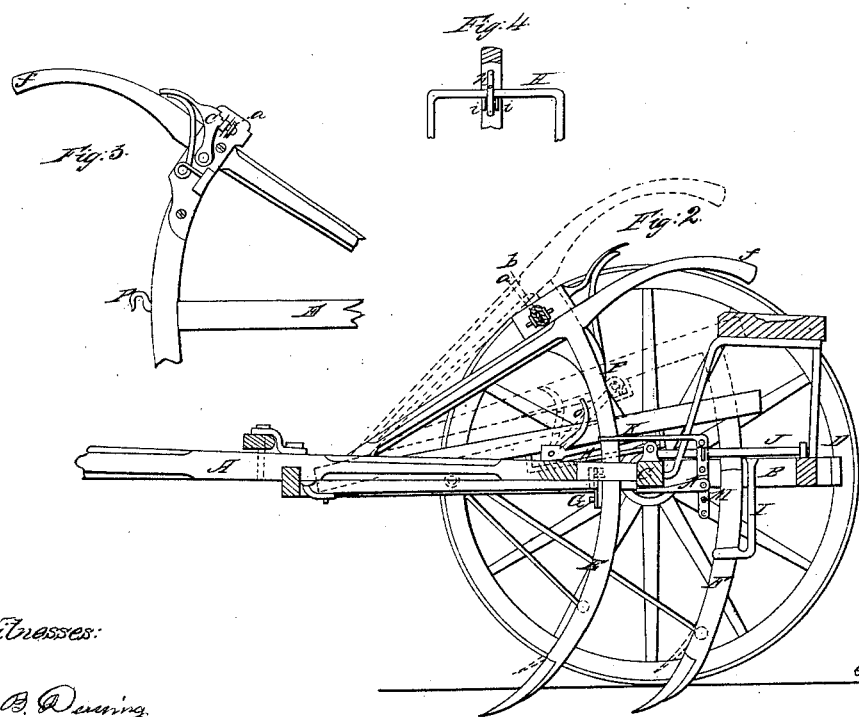
Witnesses:
W. B. Deering
Edward A. Knight
Inventor:
T. J. Martin
By Knight 2 Sheets—Sheet 2.

T. J. Martin.
Cultivator.

N° 86,170.    Patented Jan. 26, 1869.

Inventor;
T. J. Martin
By Knight Bro
Attorneys

THOMAS JACKSON MARTIN, OF WILLOW HILL, ILLINOIS.

*Letters Patent No. 86,170, dated January 26, 1869.*

IMPROVEMENT IN CULTIVATORS.

The Schedule referred to in these Letters Patent and making part of the same.

*To all whom it may concern:*

Be it known that I, THOMAS JACKSON MARTIN, of Willow Hill, in the county of Jasper, and State of Illinois, have invented a new and useful Improvement in Cultivators; and I do hereby declare the following to be a full, clear, and exact description thereof, reference being had to the accompanying drawings, which are made a part of this specification, and in which—

Figure 1 is a top view or plan.

Figure 2 is a longitudinal vertical section on the line *a b*, fig. 1.

Figure 3 is an elevation of a detached portion, showing the locking-arrangement for maintaining the adjustment of distance between the handles of the middle plows.

Figure 4 is a detached view, showing the connection between the plow-beam and the rock-bar which raises it.

Figure 5:
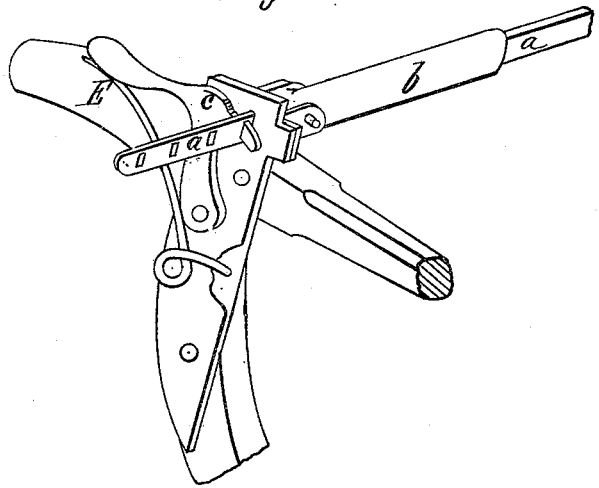
Figure 5 is a detached perspective view of part of one of the inner plow-beams, showing the device by which the lateral adjustment of the said beams is secured.

The machine is adapted to straddle a row of corn, or other plants, and has two plows travelling on each side of the row.

The inner pair is capable of four adjustments:

First, to be locked at a regulated distance apart.

Secondly, to be separately adjustable, relatively to the row.

Thirdly, to oscillate in unison at a regulated distance relatively to each other, or independently, as they are moved by the hands of the operator in following the sinuosities of the row.

Fourthly, to be raised vertically, to vary the depth of furrow, or to be entirely withdrawn from the ground, and maintained at such elevation by bars brought into action by pedals.

The outer plows have also capacity for four adjustments:

First, to maintain a regulated distance on each side of the median line of the machine; or, Secondly, to be oscillated laterally, separately or simultaneously, by an impulse from the feet of the operator applied to pedals.

Thirdly, to be raised from the ground, separately or simultaneously, and either with or without raising the middle plow, with which each is allied by position.

Fourthly, to be locked in an elevated position when the machine is to be turned, or in travelling.

By these capacities for adjustment, the lateral position of each plow on either side may be regulated independently of the others, or the whole may be swayed in unison; and further, the depth of either or all may be determined at will; or, a certain fixedness of relative distance between the inner plows may be secured, or of the outer plows relative to the median line.

I believe I have herein secured a greater variety of adjustments than can otherwhere be found in machines for this purpose.

In the drawings—

The tongue A and the quadrangular frame B are secured to each other, and to the axle C, which has two wheels, D D.

Secured by clevises to the front bar of the machine are four plows, E E, F F.

The former pair is adapted to run next to the row of plants, and is governed by handles, *f f*.

This pair of plows may be locked at a certain distance apart, by means of the hinged rod *a* on one handle, and the hinged sleeve *b* on the other handle. The rod slips in and through the sleeve as the handles are moved to and from each other, but the slipping-bar may be locked in position by a spring-latch, *c*, on one of the handles, when it is desired to maintain the said inner plows at a certain distance apart.

The standards of these plows are connected by link-bars G G to the frame.

The outer plows F F, or those nearest to the wheels, are also attached by clevises to the forward transverse beam of the frame, and the beam of each plow rests upon its separate crank-bar H, to which it is secured by a staple, *h*, beneath the beam, and studs *i* beneath the crank-bar, limiting the lateral play of the beam, as seen in the detached view, fig. 4.

The standard of each plow F is connected, by a rod, I, to a rock-bar, J, which is moved by a treadle, K, through the intervention of a rod, L.

The rod I has two fingers, which embrace the standard of the plow, and permit it to rise vertically when adjusted by the means to be described.

When, however, it is desired to set the plows F at a certain distance from the median line of the machine the vertical and perforated bar M, beneath the rear end of the treadle, is locked, by a pin passing through the arm N, so that no motion can be given to the rock-bar J. This plate has several perforations, and the choice of holes determines the distance of the plow from the median line.

The laterally-adjusting device described, is duplicated on the other side, and they are capable of separate adjustment, so that one plow may be set at any required position, and the other be free for lateral oscillation, by pressure on the pedal.

The outer plows F are raised by independent devices, which may be simultaneously or separately brought into action.

Each of the crank-bars H, upon which the plow-beams F are rested, has, projecting from its axis, a treadle, O, whereby the said crank is lifted, bringing it and the plow into the position shown in red lines in fig. 2. Either or both of the outer plows may be thus elevated without affecting the work of the middle plows.

The latter are raised by lifting upon the handles, and may be retained in an elevated position by engaging the hook P of each plow over the bar H. This engagement prevents the downward oscillation of the said bar, and holds both plows on that side in an elevated position, while the machine is being turned at the end of a row, or being moved to or from the field.

I have thus shown that the middle plows may be set at a regulated distance apart, or left free to be separately adjusted laterally by the hands of the operator, may be moved laterally in unison, or independently, may be raised separately, or together, and may be held in their elevated position; that the outer plows may be adjusted at a regulated distance from the median line, or be separately adjusted laterally by pressure on their respective pedals, one side being set, if required, and the other adjustable; that they may be raised separately, or together, either with or without affecting the vertical position of the inner plows, either or both; and that the outer plows may be locked, in elevated position, by the engagement of the hooks in the rear of the standards of the middle plows with the crank-bar by which the outer plows are lifted.

The seat is supported on the rear portion of the frame, as usual.

Having described my invention,

What I claim as new, and desire to secure by Letters Patent, is—

1. The arrangement of the plow F and crank-bar H, treadle O, armed rock-bar J, arms I L, and treadle K, in the manner as set forth.

2. In combination with the rock-bar J and arms I L, the perforated bar M, and arm N, substantially as described and represented.

3. The arrangement of the beam F, rock-bar J, and plow-standard E, substantially as described.

THOMAS JACKSON MARTIN

Witnesses:
  H. W. WHITE,
  SOLOMON BOATMAN.